United States Patent
Favero et al.

(10) Patent No.: US 11,149,186 B2
(45) Date of Patent: Oct. 19, 2021

(54) METHOD FOR ENHANCED OIL RECOVERY BY INJECTING AN AQUEOUS POLYMERIC COMPOSITION CONTAINING MICROGELS

(71) Applicants: S.P.C.M. SA, Andrezieux Boutheon (FR); POWELTEC, Rueil-Malmaison (FR)

(72) Inventors: Cédrick Favero, Andrezieux Boutheon (FR); Olivier Braun, Andrezieux Boutheon (FR); Elvire Tognisso, Andrezieux Boutheon (FR); Alain Zaitoun, Paris (FR); Nazanin Salehi, Paris (FR); Jérôme Bouillot, Carrieres sur Seine (FR)

(73) Assignees: S.P.C.M. SA, Andrezieux Boutheon (FR); POWELTEC, Rueil-Malmaison (FR)

( * ) Notice: Subject to any disclaimer, the term of this patent is extended or adjusted under 35 U.S.C. 154(b) by 116 days.

(21) Appl. No.: 16/470,461

(22) PCT Filed: Dec. 20, 2017

(86) PCT No.: PCT/FR2017/053716
§ 371 (c)(1),
(2) Date: Jun. 17, 2019

(87) PCT Pub. No.: WO2018/134489
PCT Pub. Date: Jul. 26, 2018

(65) Prior Publication Data
US 2020/0115618 A1  Apr. 16, 2020

(30) Foreign Application Priority Data

Jan. 19, 2017 (FR) ...................... 1750446

(51) Int. Cl.
*C09K 8/588* (2006.01)
*E21B 43/16* (2006.01)
*C09K 8/92* (2006.01)

(52) U.S. Cl.
CPC ............... *C09K 8/588* (2013.01); *C09K 8/92* (2013.01); *E21B 43/16* (2013.01)

(58) Field of Classification Search
CPC .. C09K 8/58; C09K 8/588; C09K 8/92; E21B 43/16
See application file for complete search history.

(56) References Cited

U.S. PATENT DOCUMENTS

2009/0264325 A1* 10/2009 Atkins ................... C09K 8/516
507/226
2011/0118153 A1    5/2011 Pich et al.
(Continued)

FOREIGN PATENT DOCUMENTS

EP    1290310 B1    3/2007
WO   2005/100423 A1   10/2005
(Continued)

OTHER PUBLICATIONS

International Search Report (and English Translation) and Written Opinion of the International Searching Authority for PCT/FR2017/053716 dated Feb. 22, 2018.
(Continued)

*Primary Examiner* — Aiqun Li
(74) *Attorney, Agent, or Firm* — Heslin Rothenberg Farley & Mesiti P.C.

(57) ABSTRACT

The present invention relates to a method for enhanced oil recovery by flushing an underground formation, comprising the injection into the underground formation of an aqueous composition comprising microgels having at least one cross-linked polymer, characterized in that the polymer is cross-
(Continued)

linked with at least one crosslinking agent capable of being degraded under the temperature conditions of the underground formation, and a content of crosslinking agent between 1 and 90 ppm per mole with respect to the total number of moles of monomer constituting the polymer.

20 Claims, 1 Drawing Sheet

(56) References Cited

U.S. PATENT DOCUMENTS

| | | |
|---|---|---|
| 2012/0292029 A1 | 11/2012 | Soucy |
| 2015/0041143 A1 | 2/2015 | Remy et al. |

FOREIGN PATENT DOCUMENTS

| | | |
|---|---|---|
| WO | 2009/131900 A1 | 10/2009 |
| WO | 2009/131901 A1 | 10/2009 |
| WO | 2010/133258 A1 | 11/2010 |
| WO | 2012/021213 A1 | 2/2012 |
| WO | 2013/015003 A1 | 1/2013 |
| WO | 2013/108173 A1 | 7/2013 |
| WO | 2015/059024 A1 | 4/2015 |

OTHER PUBLICATIONS

Thomas, S., et al., "Enhanced Oil Recovery—An Overview", Oil & Gas Science and Technology—Rev. IFP, vol. 63, No. 1, pp. 9-19 (2008).

* cited by examiner

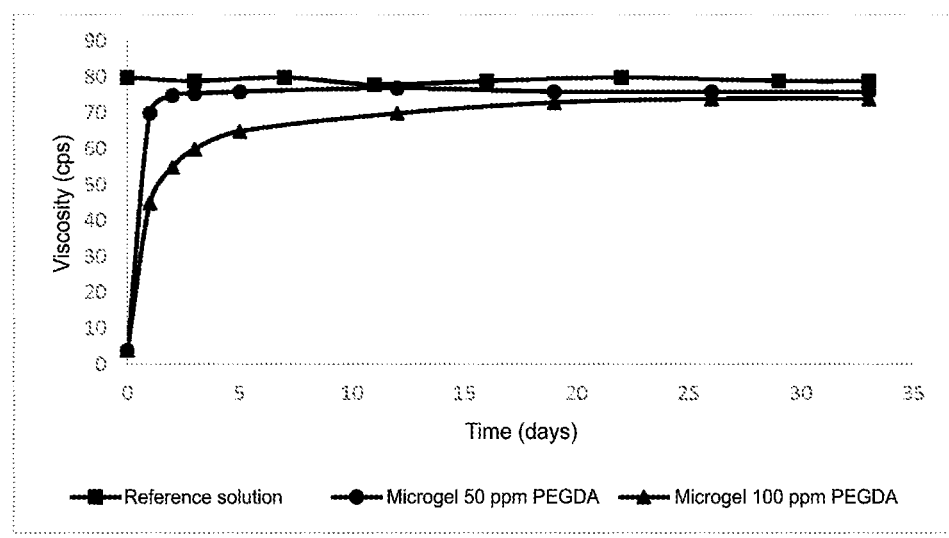

METHOD FOR ENHANCED OIL RECOVERY BY INJECTING AN AQUEOUS POLYMERIC COMPOSITION CONTAINING MICROGELS

CROSS REFERENCE TO RELATED APPLICATIONS

This application is a national stage filing under section 371 of International Application No. PCT/FR2017/053716, filed on Dec. 20, 2017, and published on Jul. 26, 2018 as WO 2018/134489, which claims priority to French Application No. 1750446, filed on Jan. 19, 2017. The entire contents of WO 2018/134489 are hereby incorporated herein by reference.

The present invention relates to the technical field of enhanced oil recovery in a deposit. More precisely, the present invention relates to an improved method for enhanced oil recovery by flushing an underground formation by means of introducing into the deposit an aqueous composition comprising microgels of polymers with low crosslinking.

Most of the oil fields exploited currently have become mature and have therefore started to decline in production or are about to. The recovery level for these fields is currently of the order of 15 to 35% on average relative to the initial quantity of oil. Therefore, they offer even more considerable production potential.

Generally, crude oil contained in deposits is recovered in several stages.

The production results first from the natural energy of the fluids and rock that decompress. After this depletion phase, the quantity of oil recovered at the surface represents on average 5 to 15% of the initial reserve. It is therefore necessary, in a second stage, to employ techniques targeting increased recovery yields while maintaining the pressure in the field.

The most frequent method consists of injecting water into the deposit through injection wells dedicated to this purpose. This is called secondary recovery. This second phase stops when the water/oil ratio is too high, i.e. when the quantity of water in the mixture produced by the producing wells is too high. This secondary recovery level produces additional recovery of the order of 10 to 20%.

The other techniques that can be used are together called enhanced oil recovery (EOR). Their goal is to recover between 10 and 35% of additional oil relative to the initial quantity. Diverse treatments with or without heat are known under the term enhanced oil recovery, such as techniques called electric, miscible, vapor, or chemical for improved recovery of remaining oil (See "*Oil & Gas Science and Technology*"—IFP review, vol 63 (2008) No. 1, pp 9-19). "Oil" means any type of oil, i.e. both light and heavy oil, or even bitumen. An oil generally results from the natural transformation of organic material and is composed of a mixture of hydrocarbons. In the description of the prior art or of the invention, the terms "petroleum" and "oil" are used to denote the same material.

The present invention more precisely relates to chemically enhanced oil recovery involving the injection, into an underground formation, of an aqueous composition containing at least one water-soluble polymer, said aqueous composition being capable of flushing the underground formation, and therefore of pushing the oil outside the rock.

The goal of the invention is not to gel the polymer to change the permeability of the rock and to block holes, a technique called "profile control" or clogging water channels.

A distinction is made between enhanced oil recovery (EOR) by flushing techniques and reservoir stimulation operations. The latter is characterized by injections of limited volumes of polymer solution to create a localized phenomenon in the reservoir. For conformance, high permeability areas are clogged from a water injection well, whereas for water shut off, a conduit is blocked by direct injection into an oil-producing well. The injections are generally done either from an injection well or from a producing well over fairly short durations of several days and generally less than one month, and with injected composition volumes representing less than 5% of the porous volume of the reservoir. The porous volume corresponds to the volume not occupied by rock in the reservoir that is a permeable zone.

Conversely, flushing enhanced oil recovery (EOR) techniques using polymers involve a continuous and prolonged injection of polymer solution to flush the reservoir from an injection well to a producing well. The aim is not to treat an area of the reservoir, but its entirety, to recover as much oil as possible. To that end, it is necessary to inject a much greater volume of aqueous solution, generally between 30% and 500%, if not more, of the porous volume. At the producing well or wells, an aqueous, oily and sometimes gaseous mixture is recovered.

In all these techniques, the efficacy of flushing by water injection is generally improved through the addition of water-soluble polymers. The expected and proven benefits of using polymers, through the "viscosification" of injected waters, are improved flushing and control of the mobility in the field so as to recover the oil quickly and effectively. These polymers increase the water's viscosity.

It is known to the person skilled in the art that synthetic water-soluble polymers, and particularly polymers containing acrylamide, are very advantageous polymers for increasing the viscosity of aqueous solutions and are in fact primarily used in enhanced oil recovery.

However acrylamide polymers are sensitive to chemical, biological and mechanical degradations. Solutions have been proposed in documents WO 2010/133258 and WO 2013/108173 to improve the resistance of the polymers to chemical degradations and high temperature. Other solutions have been proposed in documents US 2012/0292029 and US 2015/041143 to prevent mechanical polymer degradation by using a suitable material.

Nevertheless a need still exists to improve the mechanical resistance of polymers containing acrylamide in methods for enhanced oil recovery by flushing the underground formation.

The Applicant has discovered in a surprising manner that the mechanical resistance of these polymers was greatly improved when they were injected in the form of microgels with low crosslinking Microgels are a known form of acrylamide polymers. Document EP 1,290,310 describes the use of highly crosslinked expandable polymer microparticles to modify water permeability in an underground reservoir. The quantities of labile crosslinker are between 9,000 and 200,000 ppm. These microparticles obtained are water-swelling. Their swelling in some areas of the formation allows said areas to be clogged by the formation of a gel.

These microparticles are not suitable for the application of enhanced oil recovery by flushing given that they cannot propagate far into the formation and therefore cause uniform and effective flushing of the reservoir. Indeed, that gel clogs the holes in the reservoir and does not have the function of pushing the oil. The conformance treatment is specific and has the goal of modifying the permeability of the reservoir in a localized manner The Applicant focused on enhanced oil recovery by flushing the underground formation and has discovered that the use in the production of polymer of a small quantity of crosslinker that can be degraded under the temperature conditions of the underground formation could improve the mechanical resistance of the polymer.

More precisely, the present invention relates to a method for enhanced oil recovery by flushing an underground formation comprising the injection into the underground formation of an aqueous composition comprising microgels comprising at least one crosslinked polymer, characterized in that said polymer is crosslinked with at least one crosslinker capable of being degraded under the temperature conditions of the underground formation, and has a crosslinker content of between 1 and 90 ppm in moles relative to the total number of moles of monomers constituting the polymer.

In other words, and more specifically, the method according to the invention comprises the following steps:
Preparing an injection fluid (aqueous composition) from an inverse emulsion of polymer, with water or brine, to obtain microgels in said fluid,
Injecting of the injection fluid into an underground formation,
Flushing of the underground formation using the fluid injected,
Recovering an aqueous and/or oil and/or gaseous mixture.

As already indicated, the polymer is crosslinked with at least one crosslinker capable of being degraded under the temperature conditions of the underground formation. It comprises a quantity of crosslinker between 1 and 90 ppm in moles relative to the total number of moles of monomer constituting the polymer.

The method according to the invention preserves the polymer from mechanical degradations related to the preparation of the composition injected with the polymer, and to its injection, while preserving good injectivity and excellent flushing of the underground formation.

Once injected, the microgels present in the injection fluid release the polymer chains, and do so subsequent to the degradation of the crosslinking functions present in the polymer of the microgel by hydrolysis under the temperature conditions of the underground formation. Accordingly, the flushing is conducted by an aqueous composition comprising water-soluble polymers, and not microgels containing crosslinked polymers.

The polymer is a synthetic polymer, preferably a polymer obtained from at least one nonionic monomer and/or at least one anionic monomer and/or at least one cationic monomer.

The nonionic monomer or monomers that can be used in the scope of the invention can be chosen, in particular, in the group comprising water-soluble vinyl monomers. Preferred monomers belonging to this class are, for example, acrylamide, methacrylamide, N-isopropylacrylamide, N,N-dimethylacrylamide, and N-methylolacrylamide. N-vinylformamide, N-vinyl acetamide, N-vinylpyridine, N-vinylpyrrolidone, acryloyl morpholine (ACMO) and diacetone acrylamide can also be used. A preferred nonionic monomer is acrylamide.

The anionic monomer or monomers are preferably chosen from acrylic acid, methacrylic acid, itaconic acid, maleic acid, 2-acrylamido-2-methylpropane sulfonic acid (ATBS), vinylsulfonic acid, vinylphosphonic acid, said anionic monomer being non-salified, partially salified or totally salified. Salts of 3-sulfopropyl methacrylate can also be used.

The cationic monomer or monomers that can be used in the scope of the invention may be chosen in particular from among monomers of the acrylamide, acrylic, vinyl, allyl or maleic type, where these monomers have a quaternary ammonium function. Mention may be made, in particular and in a non-limiting way, of quaternized dimethylaminoethyl acrylate (ADAME), quaternized dimethylaminoethyl methacrylate (MADAME), dimethyldiallylammonium chloride (DADMAC), acrylamido propyltrimethyl ammonium chloride (APTAC) and methacrylamido propyltrimethyl ammonium chloride (MAPTAC).

According to some embodiments, the copolymers may also comprise one or more hydrophobic monomers, in addition of the monomers above. Documents WO 2005/100423 and WO 2013/15003 exemplify suitable and advantageous hydrophobic monomers.

The polymer is preferably an anionic polymer containing acrylamide, preferably an acrylamide and acrylamide tert-butyl sulfonic acid (ATBS) copolymer optionally partially post-hydrolyzed, more preferably an acrylamide, acrylic acid and acrylamide tert-butyl sulfonic acid (ATBS) terpolymer.

For an identical structure and chemistry, the viscosity of a polymer is higher when the polymer chain is longer. This is related to the physical tangling between the chains creating resistance to molecular mobility, which generates viscosity. In the scope of the present application, it is therefore advantageous to use high molecular weight polymers.

"High molecular weight" denotes molecular weights of at least 1 million g/mol, preferably between 2 and 30 million g/mol, more preferably between 5 and 20 million g/mol. Unless specified otherwise, this is the mean molecular weight by weight.

According to the invention, the polymer has low crosslinking using one or more crosslinkers that can be degraded under the temperature conditions of the underground formation, the total quantity of crosslinker(s) being between 1 and 90 ppm moles relative to the total number of moles of the monomer(s) constituting the polymer. In a preferred manner, the quantity of crosslinker(s) is between 10 and 80 ppm, more preferably between 30 and 70 ppm, even more preferably between 40 and 60 ppm.

This low and precise quantity of specific crosslinker is indispensable to produce a polymer with good resistance to mechanical degradation during the preparation of the composition injected with the polymer, and during its injection, while keeping good injectivity and good flushing performance once in the underground formation, after the polymer chains are released. Beyond this quantity, the polymer is too crosslinked and tends not to flush the reservoir correctly. Below this quantity, the polymer is more sensitive to mechanical degradation.

Temperature conditions in underground formations vary from one formation to another. So some crosslinkers will be degraded in some underground formations where the temperature is high, for example above 120° C. The same crosslinker will not be degraded in a formation where the temperature is lower, for example 60° C. Therefore the invention relates to a method wherein the crosslinking and more precisely the nature of the crosslinker or crosslinkers is adapted as a function of the temperatures in the underground formation to be treated. Advantageously, the temperature of the underground formation is between 10 and 250° C., more advantageously between 30 and 150° C.

In a preferred embodiment, the method comprises a preliminary study step, preceding the step of preparation of the injection fluid, wherein the temperature of the underground formation is taken into account to select the crosslinker or crosslinkers in such a way that the crosslinker or crosslinkers can be degraded under the temperature conditions of the underground formation. In other words, the crosslinker or crosslinkers used to crosslink the polymer are chosen to have a degradation temperature below the temperature of the underground formation.

The crosslinkers are advantageously degraded by hydrolysis. When the specific crosslinkers according to the invention are incorporated into the structure of the polymer, their degradation in the underground formation allows the polymers with low crosslinking to deploy from the microgel and thereby to increase the viscosity of the injection fluid. The polymer's integrity is not affected by this, and on the contrary the polymer had better resistance to mechanical degradations during the preparation of the injection fluid with the polymer, and during its injection, while offering very good flushing performance once released into the underground formation.

The crosslinker or crosslinkers capable of being degraded under the temperature conditions of the underground formation are preferably chosen from methylene-bis-acrylamide, diamine diacrylamides such as piperazine diacrylamide; diamine dimethacrylamides; (meth)acrylate esters of di-hydroxyl, tri-hydroxyl or tetra-hydroxyl compounds such as ethylene glycol diacrylate, polyethylene glycol diacrylate, trimethylolpropane trimethacrylate, ethoxylated triethylol triacrylate, ethoxylated pentaerythritol tetracrylate; divinyl or diallyl compounds separated by an azo group such as 2,2'-azobis(isobutyric acid) diallylamide; and vinyl or allyl esters of diacids or triacids. Preferred labile crosslinkers include water-soluble diacrylates such as PEG 200 diacrylate, PEG 400 diacrylate and PEG 600 diacrylate, and polyvinyl derivatives of polyalcohols such as 9-20 ethoxylated trimethylol triacrylate. PEG 200, 400 and 600 diacrylates have molecular weights of 200, 400 and 600 g/mol respectively. 9-20 ethoxylated crosslinkers comprise 9 to 20 ethoxy $CH_2$—$CH_1$—O groups.

Advantageously, the crosslinker used in the invention has a molecular weight below 1,500 g/mol, more advantageously below 1,000 g/mol and even more advantageously below 800 g/mol.

In a particularly advantageous embodiment of the invention, the polymer or polymers are crosslinked with at least two different crosslinkers, all being capable of being degraded under the temperature conditions in the underground formation. Preferably, the polymer or polymers according to the invention are crosslinked with at least one water-soluble diacrylate crosslinker, preferably a polyethylene glycol diacrylate, and with at least one crosslinker with an acrylamide function, preferably methylene-bis-acrylamide.

The total quantity of crosslinker according to the invention does remain between 1 and 90 ppm in moles relative to the total number of moles of monomer constituting the polymer. The ratio of one to the other may vary as a function of the temperature in the underground formation.

Preferably, the polymer, and therefore the microgels, do not contain any crosslinker that cannot be degraded under the temperature conditions of the underground formation.

Among these crosslinkers that are not degraded, mention may be made of triallylamine (TAA) and chlorinated tetraallylamine (TAAC).

The polymer used in the invention is advantageously obtained by inverse emulsion or inverse microemulsion polymerization. This polymerization technique is well known to the person skilled in the art. It consists of emulsifying an aqueous phase containing the monomer or monomers and the crosslinker or crosslinkers in an oil phase. This emulsification occurs using a water-in-oil surfactant. The microdroplets are microreactors in which polymerization takes place. An oil-in-water surfactant is optionally added to help the inversion of the emulsion in water.

In the inverse emulsion form, the polymer is found in hydrophilic micrometric droplets emulsified in the continuous oil phase. Generally the inverse emulsions contain between 20 and 60% by mass of polymer.

According to the invention, the mean size of the crosslinked polymer microgels in the composition to be injected is between 0.1 μm and 10 μm, preferably between 1 μm and 5 μm. The mean size of the crosslinked polymer microgels is the mean size of the diameter, measured with a laser measuring device using conventional techniques that are part of the general knowledge of the person of skill in the art. A device like the Mastersizer by Malvern may be used for this. The microgel corresponds to crosslinked polymer particles having swollen with water.

The polymer inverse emulsion form can be dissolved in solution, either directly in brine or injection fluid, or by using the method described in document US 2011/0118153 that proposes the dissolution of inverse emulsions of water-soluble polymers in-line and continuously.

Generally, the injection fluid contains, before its injection, between 20 ppm and 5,000 ppm by mass of one or more crosslinked polymers as described previously, preferably between 300 ppm and 4,000 ppm by mass relative to the mass of the injection fluid, i.e. the aqueous composition.

SP (Surfactant Polymer) and ASP (Alkaline Surfactant Polymer) techniques well known to the person of skill in the art may be used with the same principle according to the invention. In the same way, the viscosifying polymers of the injection fluid may be protected according to techniques described in document WO 2010/133258.

In an advantageous manner, at the moment it is injected, the injection fluid has a viscosity between 1 and 200 cps (centipoises) (viscosity measurements at 20° C. with a Brookfield viscosimeter with a UL spindle and a speed of 6 rpm).

In the scope of the invention, the viscosified aqueous composition containing microgels according to the invention is then injected in an underground formation, according to any technique known to the person of skill in the art in enhanced oil recovery (EOR) methods by flushing. It is prepared on-site, just upstream of its injection into the deposit. Generally, all the components added to the aqueous composition are more often added on a line for circulating the aqueous composition or brine.

DESCRIPTION OF FIGURES

FIG. 1 is a graph showing how the viscosity of the microgels according to the invention changes over time in anaerobic conditions.

EXAMPLE EMBODIMENTS OF THE INVENTION

An aqueous solution comprising 228.45 g of a solution of acrylamide at 50% (by weight), 451.55 g of a solution of sodium tert-butyl acrylamide sulfonate at 50% (by weight), 45 g of water and 0.77 g of Versenex® is prepared in a beaker.

This aqueous solution is separated into three samples. In two samples, polyethylene glycol diacrylate (PEG diacrylate) is added, so as to obtain three solutions containing respectively a PEG diacrylate ppm mol/mol monomer content of 0 (reference), 50 (invention) and 100 (counter-example).

Each of the resulting solutions is transferred to a reactor containing an organic solution comprising 246 g of mineral oil and 29 g of sorbitan monooleate.

The resulting mixtures are emulsified for one minute. The emulsions created in this way are then degassed by bubbling with nitrogen for thirty minutes.

To each of the emulsions terbutyl hydroperoxide and metabisulfite are then added to initiate the polymerization of monomers of the initial aqueous solution. The temperature of the reaction medium then increases. At the end of the temperature rise, the polymerization is left to continue for 2 hours.

The results are a non-crosslinked polymer and two microgels containing a crosslinked polymer with different levels of crosslinking The non-crosslinked polymer and the two microgels are then put separately into solution at a concentration of 5000 ppm in anaerobic conditions in a brine comprising, for 1000 g of brine, 40 g of NaCl, 0.55 g of KCl, 7.07 g of $CaCl_2$; $2H_2O$, 1.96 g of $MgCl_2$; $6H_2O$, 0.025 g of $BaCl_2$; $2 H_2O$, 0.07 g of $SrCl_2$; $6H_2O$, 0.07 g of $NaHCO_3$ and 0.01 g of $Na_2SO_4$.

After stirring for 2 hours, each of the solutions is transferred to a stainless-steel vial that is then placed in an oven at 60° C. Viscosity measurements are taken at regular intervals using a Brookfield viscosimeter equipped with a LV spindle at 6 rpm. These results are shown in FIG. 1.

The viscosity of the reference solution containing the non-crosslinked polymer (without PEG diacrylate) is relatively constant over time.

The viscosity of solutions containing the microgel obtained from samples containing PEG diacrylate have very low initial viscosity relative to that of the solution containing the non-crosslinked polymer.

In three days at 60° C., the viscosity of the solution containing the microgel crosslinked with 50 ppm of PEG diacrylate (invention) is comparable with that of the non-crosslinked polymer (reference). In twenty days at 60° C., the viscosity of the solution containing the microgel crosslinked with 1000 ppm of PEG diacrylate (counter-example) is comparable with that of the non-crosslinked polymer (reference).

The lower initial viscosity of the solution of microgel according to the invention and according to the counter-example makes pumping easier for the microgels than for the reference solution. Moreover, the microgel form protects the polymer from mechanical degradation during the injection.

The 3-day wait to obtain a solution with the reference viscosity allows the effective flushing of the underground formation. The polymer is therefore better protected during the injection phase while being quickly effective once in the underground formation when it is injected in the form of microgel according to the invention.

By contrast, the 20-day wait to obtain a solution with the reference viscosity is too long for obtaining effective flushing of the underground formation. Accordingly, even though the microgel form protects the polymer, crosslinking in the presence of 100 ppm of PEG diacrylate does not produce an effective fluid for enhanced oil recovery.

The invention claimed is:

1. A method for enhanced oil recovery by flushing an underground formation comprising:
   a. preparing an injection fluid from an inverse emulsion polymer, with water or brine, to obtain microgels in said fluid, the microgels comprising at least one crosslinked polymer, wherein said polymer is crosslinked with at least one crosslinker capable of being degraded under the temperature conditions of the underground formation, and has a crosslinker content of between 1 and 90 ppm in moles relative to the total number of moles of monomers constituting the polymer;
   b. injecting the injection fluid into an underground formation, wherein the crosslinked polymer of the injection fluid does not form a gel changing the permeability of the subterranean formation and blocking holes;
   c. flushing of the underground formation using the injection fluid; and
   d. recovering an aqueous and/or oil and/or gaseous mixture.

2. The method according to claim 1, wherein;
   the at least one crosslinker is selected from the group consisting of PEG 200 diacrylate, PEG 400 diacrylate, PEG 600 diacrylate, and 9-20 ethoxylated trimethylol triacrylate;
   the quantity of the at least one crosslinker is between 30 and 70 ppm; and
   the mean size of the crosslinked polymer microgels in the injection fluid is between 0.1 pm and 10 pm.

3. The method according to claim 1, wherein the method comprises a preliminary study step, preceding the step of preparation of the injection fluid, wherein the temperature of the underground formation is taken into account to select the at least one crosslinker in such a way that the at least one crosslinker can be degraded under the temperature conditions of the underground formation.

4. The method according to claim 1, wherein the quantity of the at least one crosslinker is between 10 and 80 ppm.

5. The method according to claim 1, wherein the at least one crosslinker is chosen from methylene-bis-acrylamide, diamine di(meth)acrylamides, (meth)acrylate esters of di-hydroxyl, tri-hydroxyl or tetra-hydroxyl compounds, divinyl or diallyl compounds separated by an azo group and vinyl or allyl esters of diacids or triacids.

6. The method according to claim 1, wherein the at least one crosslinker is chosen from the group consisting of water as PEG 200 diacrylate, PEG 400 diacrylate and PEG 600 diacrylate, and polyvinyl derivatives of polyalcohols.

7. The method according to claim 6, wherein the at least one crosslinker is selected from the group consisting of PEG 200 diacrylate, PEG 400 diacrylate, PEG 600 diacrylate, and 9-20 ethoxylated trimethylol triacrylate.

8. The method according to claim 1, wherein the microgels comprise at least two different crosslinkers, all being capable of being degraded under the temperature conditions in the underground formation.

9. The method according to claim 1, wherein the microgels are devoid of crosslinkers not capable of being degraded under the temperature conditions in the underground formation.

10. The method according to claim 1, wherein the mean size of the crosslinked polymer microgels in the injection fluid is between 0.1 pm and 10 pm.

11. The method according to claim 1, wherein the at least one crosslinker has a molecular weight below 1,500 g/mol.

12. The method according to claim 1, wherein the quantity of the at least one crosslinker is between 30 and 70 ppm.

13. The method according to claim 1, wherein the quantity of the at least one crosslinker is between 40 and 60 ppm.

14. The method according to claim 1, wherein the at least one crosslinker has a molecular weight below 1,000 g/mol.

15. The method according to claim 1, wherein the at least one crosslinker has a molecular weight below 800 g/mol.

16. The method according to claim 1, wherein the polymer is obtained from at least one nonionic monomer and/or at least one anionic monomer and/or at least one cationic monomer.

17. The method according to claim 16, wherein the at least one nonionic monomer is chosen from the group consisting of acrylamide, methacrylamide, N-isopropylacrylamide, N,N-dimethylacrylamide, N-methylolacrylamide, N-vinylformamide, N-vinyl acetamide, N-vinylpyridine, N-vinylpyrrolidone, acryloyl morpholine (ACMO), and diacetone acrylamide.

18. The method according to claim 16, wherein the at least one anionic monomer is chosen from the group consisting of acrylic acid, methacrylic acid, itaconic acid, maleic acid, 2-acrylamido-2-methylpropane sulfonic acid (ATBS), vinylsulfonic acid, and vinylphosphonic acid, said anionic monomer being non-salified, partially salified or totally salified, and salts of 3-sulfopropyl methacrylate.

19. The method according to claim 16, wherein the at least one cationic monomer is chosen from the group consisting of quaternized dimethylaminoethyl acrylate (ADAME), quaternized dimethylaminoethyl methacrylate (MADAME), dimethyldiallylammonium chloride (DADMAC), acrylamido propyltrimethyl ammonium chloride (APTAC) and methacrylamido propyltrimethyl ammonium chloride (MAPTAC).

20. The method according to claim 16, wherein the polymer is obtained from at least one nonionic monomer and at least one anionic monomer, and wherein the at least one nonionic monomer is chosen from the group consisting of acrylamide, methacrylamide, N-isopropylacrylamide, N,N-dimethylacrylamide, N-methylolacrylamide, N-vinylformamide, N-vinyl acetamide, N-vinylpyridine, N-vinylpyrrolidone, acryloyl morpholine (ACMO), and diacetone acrylamide; and the at least one anionic monomer is chosen from the group consisting of acrylic acid, methacrylic acid, itaconic acid, maleic acid, 2-acrylamido-2-methylpropane sulfonic acid (ATBS), vinylsulfonic acid, and vinylphosphonic acid, said anionic monomer being non-salified, partially salified or totally salified, and salts of 3-sulfopropyl methacrylate.

* * * * *